(12) United States Patent
Kim (10) Patent No.: US 9,862,340 B2
(45) Date of Patent: Jan. 9, 2018

(54) VEHICLE CONTROL SYSTEM AND CONTROL METHOD THEREOF

(71) Applicant: HYUNDAI MOTOR COMPANY, Seoul (KR)

(72) Inventor: Sung Un Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 371 days.

(21) Appl. No.: 14/815,804

(22) Filed: Jul. 31, 2015

(65) Prior Publication Data

US 2016/0121825 A1 May 5, 2016

(30) Foreign Application Priority Data

Nov. 3, 2014 (KR) .......................... 10-2014-0151538

(51) Int. Cl.
*G06F 7/00* (2006.01)
*B60R 16/037* (2006.01)
*B60K 37/06* (2006.01)

(52) U.S. Cl.
CPC .......... *B60R 16/0373* (2013.01); *B60K 37/06* (2013.01)

(58) Field of Classification Search
CPC ............................ B60R 16/0373; B60K 37/06
See application file for complete search history.

(56) References Cited

U.S. PATENT DOCUMENTS

2012/0283894 A1* 11/2012 Naboulsi ............. B60R 11/0264
701/1
2013/0124763 A1* 5/2013 Kessler ............... G06F 13/4295
710/110

FOREIGN PATENT DOCUMENTS

| JP | 09-034487 A | 2/1997 |
| JP | 2010-281572 A | 12/2010 |
| KR | 10-2010-0120740 A | 11/2010 |
| KR | 10-2012-0052805 A | 5/2012 |
| KR | 10-2013-0041421 A | 4/2013 |
| KR | 10-2013-0053915 A | 5/2013 |

* cited by examiner

*Primary Examiner* — Adam Alharbi
(74) *Attorney, Agent, or Firm* — McDermott Will & Emery LLP (57) ABSTRACT

An automotive control system includes a plurality of control units including a touch sensor. The automotive control system also includes a control unit recognizer that recognizes a control unit of the plurality of control units that a driver has touched through the touch sensor. The automotive control system also includes a voice recognizer that recognizes selection of a function of an automotive information appliance by analyzing a voice command from the driver. The automotive control system also includes a controller that connects the selected function with the recognized control unit and controls the selected function according to operation of the recognized control unit.

15 Claims, 5 Drawing Sheets

Knob unit  Joystick unit  Slider unit
201        203            205

VEHICLE CONTROL SYSTEM AND CONTROL METHOD THEREOF

CROSS-REFERENCE TO RELATED APPLICATION

This application claims priority to and the benefit of Korean Patent Application No. 10-2014-0151538 filed in the Korean Intellectual Property Office on Nov. 3, 2014, the entire contents of which are incorporated herein by reference.

TECHNICAL FILED

The present disclosure relates to an automotive control system and a method of controlling the system. More particularly, the present disclosure relates to an automotive control system that allows functions of a vehicle to be selectively performed, and a method of controlling the system.

BACKGROUND

In general, devices using buttons, knobs, voice recognition functions, and integrated control units are used to operate automotive information appliances.

Recently, as advance driver assistance system (ADAS) and facilities are added for the convenience of drivers, more devices are used in vehicles for operating the ADAS system.

Buttons and knobs have been used as input units since the start of the automotive industry. The buttons and knobs are considered safe input units while driving and are intuitive and familiar to users. However, unlimited increase of the number of buttons to follow increasing automotive functions can be problematic. As control units become more complicated, drivers have to turn their attention to finding the control units when driving.

The voice recognition function is increasingly used in automotive input devices, with the development of IT, and is expected to be used for next generation of input devices. However, although the voice recognition functions are very advantageous for simple orders such as selecting a device, these functions can be disadvantageous for analog operations such as controlling the intensity of a fan.

On the other hand, in luxurious vehicles a wheel type of integrated control unit is usually mounted around the transmission selector. This type of integrated control unit is advantageous in minimizing the movement required by the driver. However, this control unit can be disadvantageous in that the depth of their User Interface (UI) is large in comparison to a touch screen, and therefore it is difficult for the driver to select functions and their operation time is long.

As described above, as the variety and number of control units increase with the increase of automotive functions, it becomes difficult to arrange the control units. In addition, as the control units become more complicated, drivers have to turn their attention to operating these units.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an automotive control system having advantages of being able to select automotive functions by recognizing voice and selectively activating a control unit to perform selected functions, by complementing the merits and drawbacks of a voice recognition device and a control unit, and a method of controlling the system.

An exemplary embodiment of the present invention provides an automotive control system that includes: a plurality of control units including a touch sensor; a control unit recognizer that recognizes a control unit from the plurality of control units that a driver has touched through the touch sensor; a voice recognizer that recognizes selection of a function of an automotive information appliance by analyzing a voice command from the driver; and a controller that connects the selected function with the recognized control unit and controls the selected function according to operation of the control units.

The touch sensor may sense approach or touch by the driver's hand, using any one of an impedance sensor, an optical sensor, and a button-type sensor.

The control unit may be at least any one of a knob unit that can be rotated, a joystick unit that can select directions, and a slider unit.

The voice recognizer may recognize selection of the function of the automotive information appliance by analyzing a voice command, which is inputted with the control unit touched, using a voice engine.

The voice recognizer may directly select lower level menus for main functions without an intermediate process by analyzing the voice command.

The voice recognizer may limit the range of a database of voice recognition words to menus for selected functions, for analyzing the voice command.

The controller may activate the voice recognizer when receiving information about a control unit touched by a driver from the control unit recognizer.

When the voice command fails to be recognized, the controller may create a list of probable functions in accordance with the priority of similarity with the input voice command and make the list be displayed, and may output the function with the next priority by a voice in accordance with rotation or another operation of the control unit touched by the driver.

The controller may list the functions which have been designated by voice commands for a predetermined period of time, and may output the functions in the list as the driver rotates or operates the control unit that he/she has held.

When a driver's touch is not recognized on the control unit for a predetermined time or a driver inputs a voice command for stopping a function, the controller may make the previous image be automatically displayed again by deleting the displayed image of the function.

Another exemplary embodiment of the present invention provides a method of an automotive control system that selectively designates and performs various functions of a vehicle. The method includes: recognizing a control unit touched by a driver of a plurality of control units in a vehicle; recognizing selection of a function of an automotive information appliance by analyzing a voice command from the driver; connecting the selected function with the control unit for cooperation and controlling the function according to operation of the control unit; and returning to a function set as a default in the control unit when the control unit completes performing the function.

In the recognizing of selection of a function, a voice recognition function may be activated with a driver's hands on the control unit.

In the connecting of the selected function with the control unit, lower level menus for main functions of the automotive information appliance may be directly connected without an intermediate process.

In the returning to a function set as a default in the control unit when a driver's hand is not recognized on the control unit or when the driver deactivates the function through a voice command, it may be determined that the driver has stopped the function.

The connecting of the selected function with the control unit may include stopping a function set as a default of the control unit and giving authority of performing the selected function.

Another exemplary embodiment of the present invention provides a method of an automotive control system that selectively designates and performs various functions of a vehicle.

The method includes: recognizing that a driver has touched an integrated control unit in a vehicle; recognizing selection of a function of an automotive information appliance by analyzing a voice command from the driver; connecting the selected function with the control unit for cooperation and controlling the function according to operation of the control unit; storing the last connected function when the control unit completes performing the function; and calling for and making the last connected function be displayed, and performing the function again, when the integrated control unit is touched again.

DETAILED DESCRIPTION

In the following detailed description, certain exemplary embodiments of the present invention have been shown and described, simply by way of illustration. As those skilled in the art would realize, the described embodiments may be modified in various different ways, all without departing from the spirit or scope of the present disclosure. Accordingly, the drawings and descriptions are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

An automotive control system and an automotive control method according to an exemplary embodiment of the present invention are described hereafter in detail with reference to the accompanying drawings.

Figure 1:
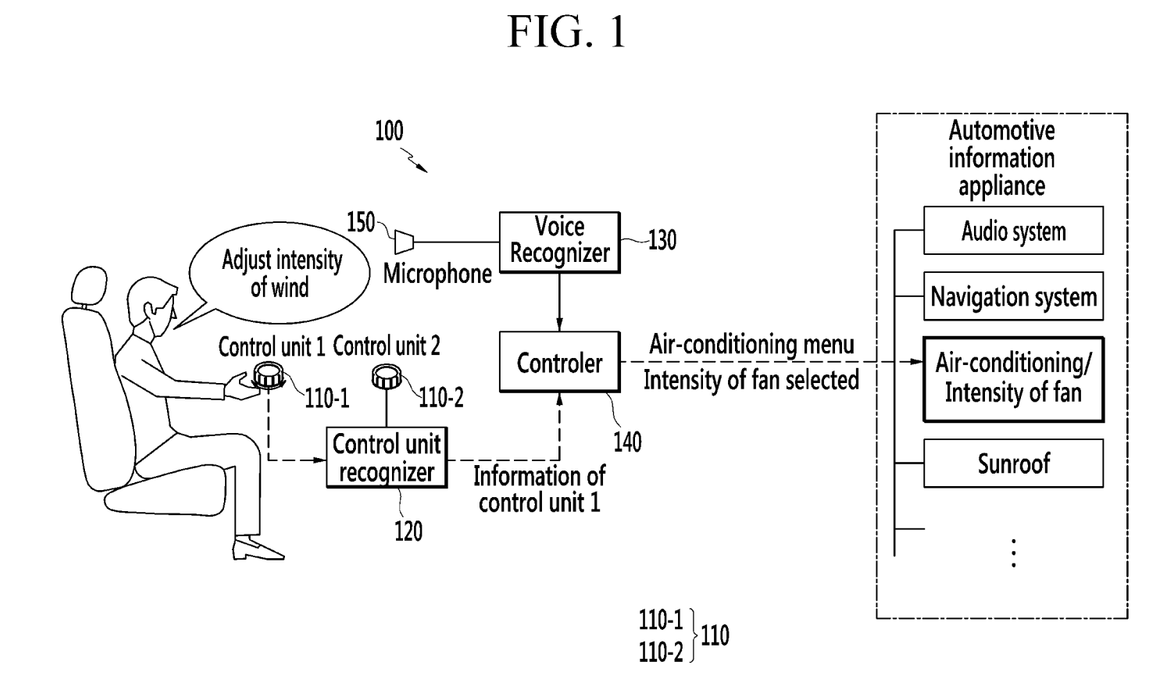
FIG. 1 is a block diagram illustrating the configuration of an automotive control system according to an exemplary embodiment of the present invention.

FIG. 1 is a block diagram illustrating the configuration of an automotive control system according to an exemplary embodiment of the present invention.

Figure 2:
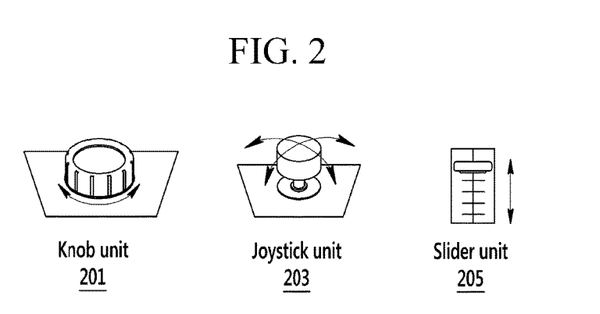
FIG. 2 is a diagram showing a type of control unit that can be applied in accordance with exemplary embodiments of the present invention.

FIG. 2 is a diagram showing a type of controller that can be applied in accordance with exemplary embodiments of the present invention.

Referring to FIG. 1, an automotive control system 100, according to an exemplary embodiment of the present invention, includes control unit 110 (which includes control units 110-1 and 110-2), a control unit recognizer 120, a voice recognizer 130, and a controller 140.

The control unit 110 may include a knob unit 201 that can be rotated, a joystick unit 203 that can select directions, or a slider unit 205. The control unit 110 may be disposed around a center fascia, a steering wheel, or a transmission selector.

The components of the control unit 110 may each include a touch sensor that can recognize approach or touch by a driver. The touch sensor function may be achieved by any one of an impedance sensor, an optical sensor, and a button-type sensor.

The impedance sensor has an electrode in the control unit 110 and can sense approach or touch by a driver by measuring impedance of the driver's hand. The optical sensor includes light emitting and light receiving LEDs to sense approach or touch of a driver's hand by measuring dispersion and reflection of light due to the hand. The button-type sensor includes a sensor that measures at least one of force, position, and displacement when physical force is applied to sense approach or touch of a hand through the sensor.

The control unit recognizer 120 recognizes a component of the control unit 110 which is selected by a driver from sensing information of the control unit 110, and transmits the information about the recognized component of the control unit 110 to the controller 140.

For example, in FIG. 1, the control unit recognizer 120 may transmit information about the first control unit 110-1 showing that the first control unit 110-1 has been touched by a driver.

The voice recognizer 130 includes a microphone 150 that receives voice commands from a driver and a voice engine (not shown in FIG. 1) that recognizes the voice commands.

The voice engine of the voice recognizer 130 recognizes selection of a function of an automotive information appliance such as an audio system, a navigation system, or an air-conditioning system by analyzing a voice command, which is inputted after any one component of the control unit 110, is selected.

Figure 3:
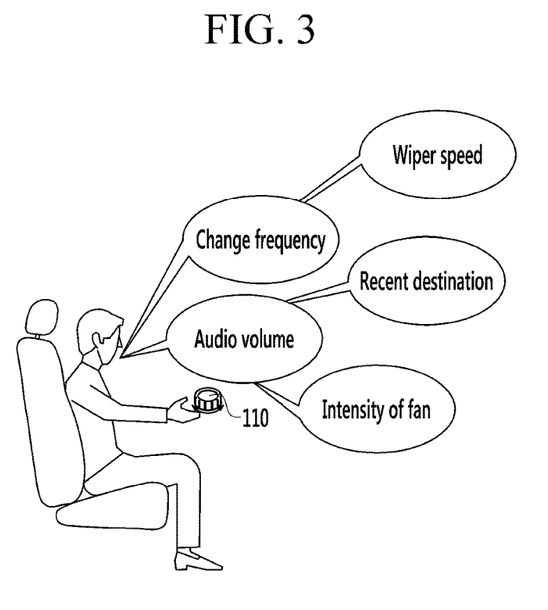
FIG. 3 is a view showing an example in which a driver selects functions, according to an exemplary embodiment of the present invention.

FIG. 3 is a view showing an example in which a driver selects functions, according to an exemplary embodiment of the present invention.

Referring to FIG. 3, when a voice recognition function is activated with a driver holding the control unit 110, the driver may give a voice command for selecting a function.

The voice recognizer 130 can recognize not only selection at the level of main functions, but selection of lower level menus of the main functions, by analyzing the input voice command.

Accordingly, the voice recognizer 130 allows a driver to directly select desired menus without an intermediate process for selecting lower level menus through several steps due to the architecture of a UI. Such an advantage can complement the drawbacks of the integrated control unit described above.

There are many instructions for voice recognition in a voice interface scenario started from the existing PTT (Push-to-Talk) type, so the possibility of misrecognition is high.

However, a database of voice recognition words is provided for the voice recognizer 130 of the present disclosure to analyze voice commands inputted after the control unit 110 is selected. The database may be limited to the menus of the functions of an automotive information appliance.

That is, the range of the voice recognition by the database can be reduced in comparison to the existing PTT type, such that the voice recognition rate can be increased, and accordingly, it is possible to reduce inconvenience to a user due to a recognition process and feedback delay.

For example, when a driver holds (touches) a component of the control unit 110 and gives a voice command to perform a specific function, the controller 140 controls the component of the control unit 110 to perform the function designated by the voice command.

When the controller 140 receives the information about a component of the control unit 110 that has been selected by a driver from the control unit recognizer 120, it activates the voice recognizer 130.

The controller 140 selectively connects functions (menus) corresponding to voice commands recognized by the voice recognizer 130 and allows them to be displayed.

The controller 140 controls the connected control function in cooperation with the component of the control unit 110 which has been selected by the driver.

For example, when a driver inputs a voice command 'change the frequency' with the knob unit of the center fascia or a wheel type of integrated control unit in his/her hand, the corresponding unit can operate as a unit that changes the radio frequency of an audio system.

On the other hand, when a user inputs a voice command (for example, 'change the frequency'), the function may not be typically performed due to operation noise of the vehicle, external noise, or a problem with pronunciation.

When a voice command fails to be recognized, as described above, the controller 140 creates a list of probable functions in accordance with the priority of similarity with the input voice command and provides it to be displayed to the driver. The function with the next priority may be output by a voice in accordance with rotation or other operation of the control unit 110 touched by the driver. Then, when the function that the driver wants is in the list, the driver can select the function by pushing the control unit 110 or pressing a specific button.

The controller 140 may list the functions which have been recently designated by voice commands within a predetermined period of time, and it can output the functions in the list as the driver rotates or operates the control unit 110. Then, when the function that the driver wants is in the list, the driver can select the function by pushing the control unit 110 or pressing a specific button.

When the driver takes his/her hand off the control unit 110 and a driver's hand is not recognized or when the driver deactivates the function through a voice command, the controller 140 may stop the function selected by the driver. In this case, the corresponding display disappears and the previous display is automatically displayed again.

An automotive control method according to an exemplary embodiment of the present invention will now be described on the basis of the configuration of the automotive control system 100.

Figure 4:
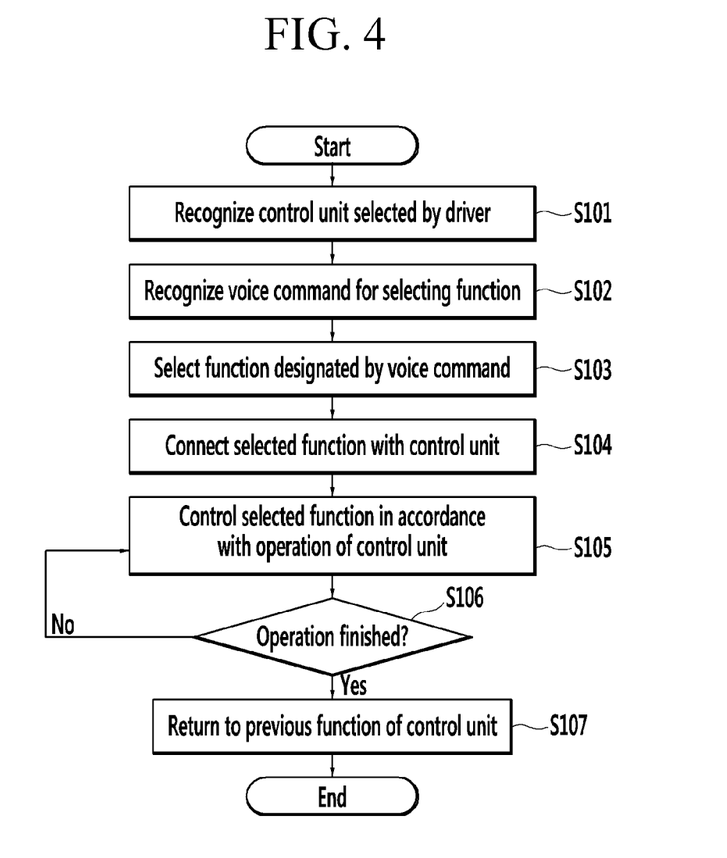
FIG. 4 is a flowchart illustrating an automotive control method according to a first exemplary embodiment of the present invention.

In a first exemplary embodiment of the present invention, a scenario is assumed in which a control unit that is set to perform a specific function (for example, control of audio volume) as a default performs a function selected by a driver. FIG. 4 is a flowchart illustrating an automotive control method according to the first exemplary embodiment of the present invention.

Referring to FIG. 4, at step S101 the automotive control system 100 recognizes a control unit 110, which is touched by a driver, among a set of control units. For example, when the control unit 110 is a knob unit for adjusting audio volume as a default on the center fascia, a touch sensor can sense that a driver holds the control unit 110 with a hand.

At step S102, the automotive control system 100 recognizes a voice command from the driver through the voice recognizer 130. For example, it is assumed that the automotive control system 100 has recognized a voice command, 'adjust the frequency'.

The automotive control system 100 can activate the voice recognition function when touch on the control unit 110 is recognized. However, the present disclosure is not limited thereto in the exemplary embodiment of the present invention, and it may be possible to activate the voice recognition function in cooperation with a PPT button.

At step S103, the automotive control system 100 selects the function (that is, the function of adjusting a frequency) designated by the voice command and provides the selected function to be displayed. The automotive control system 100 also connects the selected function to the control unit 110 for cooperation, at step S104. Connecting the selected function to the control unit 110 by the automotive control system 100 means that the knob unit 110 selected by the driver is given authority for adjusting the frequency.

Accordingly, the automotive control system 100 can control the selected function of adjusting a frequency in accordance with operation of the control unit 110, as shown in step S105.

Thereafter, while the driver's hand is sensed on the control unit 110, the automotive control system 100 determines that the function is being performed (S106; No).

On the contrary, when the driver's hand is not recognized on the control unit 110 for a predetermined time in step S106 or the driver stops the function with a voice command, the automotive control system 100 determines that the driver has completed carrying out a function (S106; Yes).

Accordingly, at step S107, the automotive control system 100 returns to the previous function of the control unit 110).

That is, the automotive control system 100 withdraws the authority of adjusting a frequency given to the knob unit 110 and can, for example, return to the function of adjusting audio volume set as the default.

The first exemplary embodiment of the present invention is not limited to the scenario described above and may be generally used for functions that need to be controlled in a vehicle such as changing an audio track, changing volume, changing preset, changing music, adjusting the air-conditioning direction, adjusting the intensity of a fan, adjusting temperature, adjusting seat temperature, adjusting wiper speed, adjusting brightness of a cluster, changing a seat position, adjusting a window, adjusting a sunroof, etc.

Figure 5:
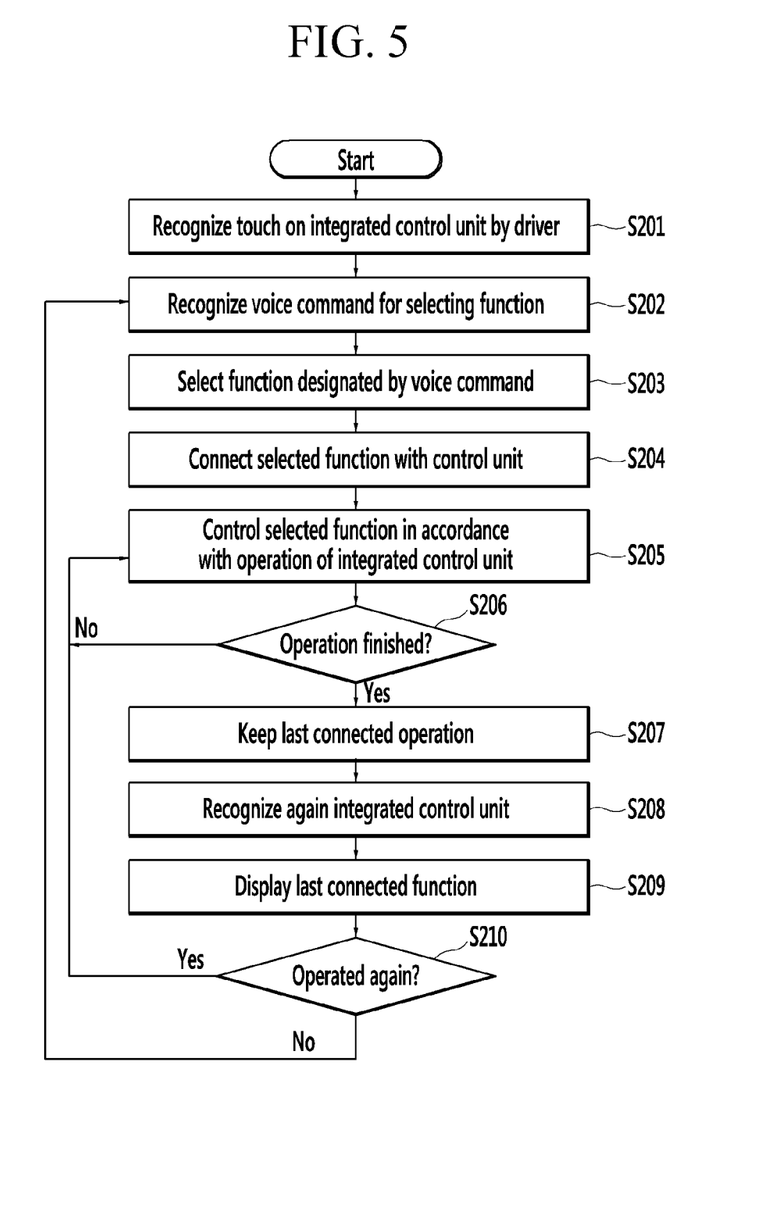
FIG. 5 is a flowchart illustrating an automotive control method using an integrated control unit according to a second exemplary embodiment of the present invention.

In a second exemplary embodiment of the present invention, a scenario is assumed in which an integrated control unit that has to go through several steps from selecting various main functions to select lower level menus without a specific default function, performs a function selected by a driver.

FIG. 5 is a flowchart illustrating an automotive control method using an integrated control unit according to a second exemplary embodiment of the present invention.

Referring to FIG. 5, at step S201, the automotive control system 100, according to an exemplary embodiment of the present invention, recognizes a touch by a driver on the control unit 110. The integrated control unit 110 is a control unit that is disposed around a transmission selector or on a steering wheel so that a driver moves the minimum distance to operate it, and allows for selecting and performing various functions.

Thereafter, steps S202 to S206, which are processes of controlling a selected function by recognizing a voice command, are similar to steps S102 to step S106 of FIG. 4, and are not described in detail here.

When it is determined, at step S206, that the driver has completed selecting a function (S206; Yes), at step S207 the automotive control system 100 keeps (e.g., stores in a memory) the last connected function (for example, the function of adjusting a frequency).

In the second embodiment, unlike the first embodiment described with regards to FIG. 4, the integrated control unit 110 may not have a function set as a default. Therefore, the last connected authority is stored.

When a series of the automotive control is completed and it is recognized, at step S208, that the driver touches the integrated control unit 110, the automotive control system 100 calls for the last connected function (for example, the function of adjusting a frequency, kept (e.g., stored) at step S207). At step S209 the automotive control system provides the stored last connected function to be displayed.

The automotive control system 100 again performs the function of adjusting a frequency, which was performed last (S210; Yes), and controls the selected function in accordance with operation of the integrated control unit 110, at step S205.

In contrast, when the drivers does not want the kept (e.g., stored) operation to be performed again, but wants another operation in step S210 (S210; No), the automotive control system 100 can select and control the function that the driver wants by returning to step S202 for recognizing a voice command from the driver through the voice recognizer 130.

According to the exemplary embodiments of the present invention, it is possible to perform various functions by designating desired functions through desired control units while a vehicle is driven, such that the driver does not have to find control systems, and accordingly, dispersion of attention and risks can be reduced.

Further, the merits and drawbacks of a voice recognition device and a control unit are complemented, so that automotive functions can be directly designated by voice recognition, and designated functions are selectively performed by control units. Therefore, it is possible to reduce the time for performing functions with high UI depth.

In addition, by integrating control devices for the increasing automotive functions, it is possible to suppress complication in arrangement of control devices, so that it is possible to prevent a driver from diverting his/her attention. The integrated control also provides convenience for designing the interior of a vehicle.

Exemplary embodiments of the present invention are not implemented only by the apparatus and/or method described above, but may be implemented by programs that implement the function of the configurations in the exemplary embodiments of the present invention or recording medium having the programs, and the present disclosure can be easily implemented by those skilled in the art from the exemplary embodiments described above.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An automotive control system comprising:
   a plurality of control units including a touch sensor;
   a control unit recognizer that recognizes a control unit of the plurality of control units that a driver has touched through the touch sensor;
   a voice recognizer that recognizes selection of a function of an automotive information appliance by analyzing a voice command from the driver; and
   a controller that connects the selected function with the recognized control unit and controls the selected function according to operation of the recognized control unit, and
   wherein when the voice command fails to be recognized, the controller creates a list of probable functions in accordance with a priority of similarity with the voice command, provides the list for display, and outputs a function having the next priority in the list as the selected function in accordance with the operation of the recognized control unit touched by the driver.

2. The automotive control system of claim 1, wherein the touch sensor senses approach or touch by the driver's hand, using any one of an impedance sensor, an optical sensor, and a button-type sensor.

3. The automotive control system of claim 1, wherein the control unit is at least any one of a knob unit that can be rotated, a joystick unit that can select directions, and a slider unit.

4. The automotive control system of claim 1, wherein the voice recognizer recognizes selection of the function of the automotive information appliance by analyzing a voice command, which is inputted with the control unit touched, using a voice engine.

5. The automotive control system of claim 1, wherein the selected function is a main function and the voice recognizer directly selects lower level menus for the main function without an intermediate process by analyzing the voice command.

6. The automotive control system of claim 1, wherein for analyzing the voice command, the voice recognizer limits range of a database of voice recognition words to menus for the selected function.

7. The automotive control system of claim 1, wherein the controller activates the voice recognizer when receiving, from the control unit recognizer, information about a control unit touched by the driver.

8. An automotive control system comprising:
   a plurality of control units including a touch sensor;
   a control unit recognizer that recognizes a control unit of the plurality of control units that a driver has touched through the touch sensor;
   a voice recognizer that recognizes selection of a function of an automotive information appliance by analyzing a voice command from the driver; and
   a controller that connects the selected function with the recognized control unit and controls the selected function according to operation of the recognized control unit, wherein the controller creates a list of functions which have been recently selected by voice commands for a predetermined period of time, and outputs a function in the list as the selected function in accordance with the operation of the recognized control unit touched by the driver.

9. The automotive control system of claim 1, wherein when the driver's touch is not recognized at the control unit for a predetermined period of time, or when the driver inputs a voice command for stopping the selected function, the controller displays an image related to a previous function and deletes a displayed image related to the stopped function.

10. An automotive control method for selectively designating and performing various functions of a vehicle, the method comprising:
   recognizing a control unit of a plurality of control units in a vehicle, that is touched by a driver;
   recognizing selection of a function of an automotive information appliance by analyzing a voice command from the driver;
   connecting the selected function with the recognized control unit for cooperation and controlling the selected function according to operation of the recognized control unit;
   returning to a function set as a default of the recognized control unit when the recognized control unit completes performing the selected function; and
   when the voice command fails to be recognized, creating a list of probable functions in accordance with a priority of similarity with the voice command, providing the list for display, and outputting a function having the next priority in the list as the selected function in accordance with the operation of the recognized control unit touched by the driver.

11. The method of claim 10, wherein in the recognizing the selection of the function, a voice recognition function is activated with the driver's touch of the control unit.

12. The method of claim 10, wherein the selected function is a main function of the automotive information appliance, and in the connecting of the selected function with the recognized control unit, lower level menus for the main function are directly connected without an intermediate process.

13. The method of claim 10, wherein in the returning to the function set as the default in the control unit, when the driver's touch is not recognized at the control unit or when the driver deactivates the function through a voice command, it is determined that the driver has stopped the function.

14. The method of claim 10, wherein the connecting of the selected function with the control unit includes stopping the default function set of the control unit and giving authority for performing the selected function.

15. An automotive control method for selectively designating and performing various functions of a vehicle, the method comprising:
   recognizing that a driver has touched an integrated control unit in a vehicle;
   recognizing selection of a function of an automotive information appliance by analyzing a voice command from the driver;
   connecting the selected function with the recognized control unit for cooperation and controlling the selected function according to operation of the recognized control unit;
   storing a last function connected prior to the selected function, when the control unit completes performing the selected function;
   calling and displaying the last function, and performing the last function, when the integrated control unit is touched again; and
   when the voice command fails to be recognized, creating a list of probable functions in accordance with a priority of similarity with the voice command, providing the list for display, and outputting a function having the next priority in the list as the selected function in accordance with the operation of the recognized control unit touched by the driver.

* * * * *